Nov. 24, 1936.  R. C. JACOBS  2,062,092
GLARE SHIELD
Filed June 20, 1935
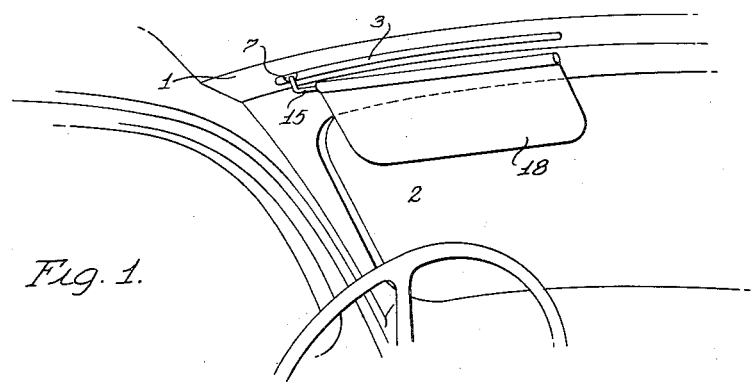
Fig. 1.
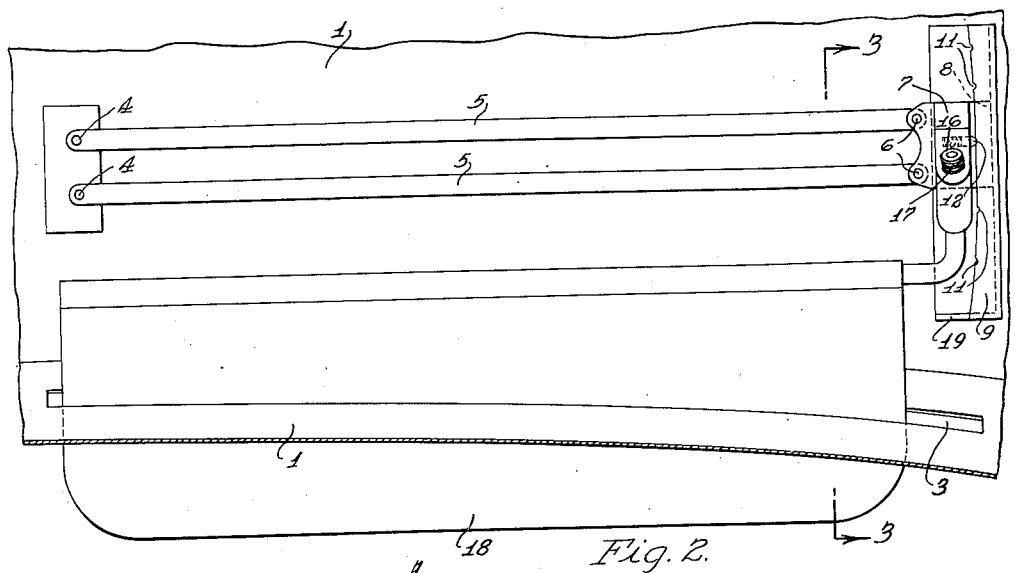
Fig. 2.
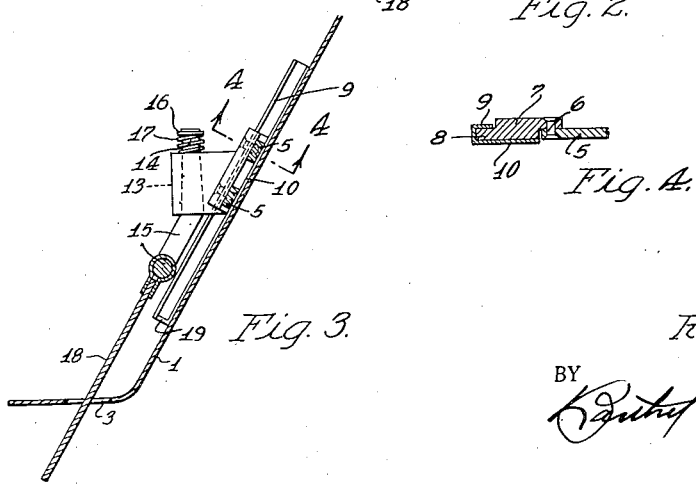
Fig. 3.    Fig. 4.
INVENTOR.
Rex C. Jacobs
BY 
ATTORNEYS Patented Nov. 24, 1936

2,062,092

UNITED STATES PATENT OFFICE 2,062,092

GLARE SHIELD

Rex C. Jacobs, Detroit, Mich.

Application June 20, 1935, Serial No. 27,473

7 Claims. (Cl. 296—97)

The present invention relates to glare shields for automotive vehicles and more particularly to means for supporting such shields.

The primary object of the present invention is to provide means for supporting a glare shield so that it may be concealed from view when its use is not required by moving it into the space between the header and the roof of an automobile. In my co-pending application filed May 25, 1935, Serial No. 23,351, issued September 15, 1936, as Patent No. 2,054,325, there is disclosed means for movably supporting a glare shield bracket so that it may accomplish this objective and this invention differs therefrom in that it provides an articulated support in the place of the sliding support of the other application.

Another object of the invention is to provide an articulated support for a bent arm type glare shield, the said articulated support being concealed at all times by disposing it on the inside of the header, and providing means for supporting the glare shield so that it may be moved through a slot in the header and into the space between the header and the roof of an automobile body.

With the above and other ends in view the invention is more fully described with reference to the accompanying drawing, in which—

Figure 1 is a fragmentary perspective view of an automobile with the glare shield assembled therein;

Fig. 2 is an elevation of the invention mounted on a header;

Fig. 3 is a section taken on the line 3—3 of Fig. 2, and

Fig. 4 is a section taken on the line 4—4 of Fig. 3.

Like characters of reference are employed throughout to designate corresponding parts.

In the drawing the numeral 1 designates the header of an automobile body comprising an inclined member disposed above the windshield 2. The header, in conventional body constructions forms a part of the ceiling of the body and is spaced downwardly from the roof with the result that a space exists between the header and the roof. This invention aims to utilize this space by concealing a glare shield and its supporting mechanism therein.

The header 1 is provided with a slot 3 and adjacent to one end of the slot a pair of pivots 4 are secured thereto and support a pair of parallel rods 5. The rods extend in the direction of the length of the slot 3 and are pivotally attached at 6 to a bracket 7. The bracket 7 has a projecting part 8 extending beneath a guide flange 9 on a plate 10 which is secured to the header 1 adjacent to the said other end of the slot 3. The guide flange 9 has a series of indentations 11 and the bracket 7 carries a spring pressed plunger 12 adapted to project into the indentations 11 for the purpose of resisting movement of the bracket 7 with respect to the guide plate and header.

The bracket 7 is provided with a conical bore 13 receiving the tapered end 14 of a bent arm 15. To the upper end of the tapered end 14 is secured a washer 16 and a spring 17 is compressed between the bracket 17 and washer 16 to draw the tapered end into the bore in a manner to set up a friction condition which resists, but does not prevent, rotation of the tapered end within the bore. On the arm 15 is mounted a glare shield 18, and on the plate 10 is a projecting lug 19. The arm 15 constitutes a horizontal pivot for the shield 18, as may be readily seen upon reference to Fig. 3.

With the shield in the position shown in Fig. 1 the bracket 7 has been removed, with respect to the guide plate 10, until it engages the projecting lug 19 and is positively stopped thereby. When in this position the shield 18 may be moved to various positions of adjustment by rotating the arm 15 around its fulcrum in the bracket 7. When use of the shield 18 is not desired it may be moved upwardly through the slot 3 and entirely disposed above the header 1. The shield 18 may be exposed different amounts through the slot 3 as shown in Figures 2 and 3 and will be held in several positions of adjustment by the spring pressed plunger 12 and the indentations 11.

Although a specific embodiment of the invention has been illustrated and described it will be understood that various changes may be made within the scope of the appended claims without departing from the spirit of the invention, and such changes are contemplated.

What I claim is:—

1. In combination, a vehicle body having a wall composed of a pair of members arranged to provide a space within the wall, one of said wall members being of anguar formation and having a slot in one of the parts thereof, a lever pivotally attached to the other angular part of said member, a glare shield, means on the the free end of said lever for attaching said glare shield thereto whereby it is movable through said slot, and means for guiding movement of said shield during pivotal movement of said lever.

2. In combination with a vehicle wall member having a compartment therein and an opening providing an entrance to said compartment, parallel levers pivotally mounted within said compartment, a rigid glare shield, means for supporting said glare shield on said levers whereby it may be moved through said opening into and out of said compartment, and means engaging said last named means for guiding the movement of said shield during movement of said levers.

3. In combination, a vehicle header of angular cross section having an elongated slot in one of the angular portions thereof, a lever having one of its ends pivotally connected to the other angular portion of the header adjacent to one end of said slot and having its free end disposed adjacent to the other end of said slot, means for restricting pivotal movement of said lever whereby to prevent the free end thereof from passing through said slot, a glare shield, means for connecting said glare shield to the free end of said lever whereby it may be moved to position on opposite sides of said slotted angular portion, a spring pressed detent carried by the free end of said lever, and spaced apart elements adapted to be engaged by said detent to yieldably hold said lever in positions of adjustment.

4. In a vehicle body having a windshield opening and a header extending transversely above said opening, said header having a slot therein, a glare shield, a mounting device for said glare shield comprising a vertical pivot, means supporting said pivot for vertical movement bodily with respect to said header, means connected to said pivot and supporting said glare shield whereby movement of said pivot bodily permits movement of said shield through said slot, and means for maintaining said pivot in a substantially vertical position during movement of said shield through said slot.

5. In a vehicle body having a windshield opening and a header extending transversely above said opening, said header having a slot therein, a glare shield, a mounting device for said glare shield comprising a vertical pivot, means supporting said pivot for vertical movement bodily with respect to said header, means connected to said pivot and supporting said glare shield whereby movement of said pivot bodily permits movement of said shield through said slot, means for guiding the movement of said pivot to maintain it in alignment with said slot, and means for maintaining said pivot in a substantially vertical position during movement of said shield through said slot.

6. In a vehicle body having a windshield opening and a header extending transversely above said opening, said header having a slot therein, a glare shield, a mounting device for said shield comprising a vertical pivot, means connected to said pivot and supporting said shield in a horizontal position, means on the inner side of said header supporting said pivot for movement bodily with respect to said header whereby the pivot may move to permit movement of said shield through said slot, and means for maintaining said pivot vertical and said shield horizontal during such movement.

7. In a vehicle body having a windshield opening and a header extending transversely above said opening, said header having a slot therein, a glare shield, a mounting device for said glare shield comprising a vertical pivot, means supporting said pivot for vertical movement bodily with respect to said header, means connected to said pivot and supporting said glare shield whereby movement of said pivot bodily permits movement of said shield through said slot, said shield supporting means including a horizontal pivot for said shield, and means for maintaining said vertical pivot vertical and said horizontal pivot horizontal during movement of said shield through said slot.

REX C. JACOBS.